United States Patent
Chuman et al.

(10) Patent No.: US 10,954,853 B2
(45) Date of Patent: Mar. 23, 2021

(54) FURNACE WALL, GASIFICATION UNIT AND INTEGRATED GASIFICATION COMBINED CYCLE, AND METHOD OF MANUFACTURING FURNACE WALL

(71) Applicant: Mitsubishi Hitachi Power Systems, Ltd., Yokohama (JP)

(72) Inventors: Fumihiro Chuman, Yokohama (JP); Masashi Kitada, Yokohama (JP); Makoto Toyomaru, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 268 days.

(21) Appl. No.: 16/311,295

(22) PCT Filed: Oct. 11, 2017

(86) PCT No.: PCT/JP2017/036731
§ 371 (c)(1),
(2) Date: Dec. 19, 2018

(87) PCT Pub. No.: WO2018/070394
PCT Pub. Date: Apr. 19, 2018

(65) Prior Publication Data
US 2019/0186358 A1    Jun. 20, 2019

(30) Foreign Application Priority Data

Oct. 12, 2016  (JP) .............................. JP2016-201253

(51) Int. Cl.
*F02C 3/28* (2006.01)
*F23M 5/08* (2006.01)
(Continued)

(52) U.S. Cl.
CPC ................ *F02C 3/28* (2013.01); *C10J 3/485* (2013.01); *C10J 3/526* (2013.01); *C10J 3/74* (2013.01);
(Continued)

(58) Field of Classification Search
CPC .... C10J 3/74; C10J 3/1892; C10J 3/00; F28D 2021/0075; C10K 1/04
See application file for complete search history.

(56) References Cited

U.S. PATENT DOCUMENTS 2,179,638 A    11/1939  Koppers
4,520,760 A *  6/1985  Covell ........................ C10J 3/76
                                                  122/6 A
(Continued)

FOREIGN PATENT DOCUMENTS

DE            892359 C    10/1953
GB            376974 A     7/1932
(Continued)

OTHER PUBLICATIONS

International Search Report dated Dec. 5, 2017, issued in counterpart Application No. PCT/JP2017/036731, with English translation (5 pages).
(Continued)

*Primary Examiner* — Matthew J Merkling
(74) *Attorney, Agent, or Firm* — Westerman, Hattori, Daniels & Adrian, LLP

(57) ABSTRACT

The purpose of the present invention is to provide a furnace wall in which a throat section with a smaller channel diameter than other regions can be formed using all peripheral wall tubes. Provided is a furnace wall comprising: a plurality of peripheral wall tubes (142), which are disposed so as to form a cylindrical shape when aligned in one direction and through the interior of which cooling water
(Continued)

flows; and fins (140) that connect neighboring peripheral wall tubes (142) in an airtight manner. In a throat section in which the diameter of a horizontal cross-section of the cylindrical shape is reduced in comparison to other regions, the peripheral wall tubes (142) are disposed so as to be in mutual contact and the fins (140) are disposed on the inner circumferential sides of the cylindrical shapes.

7 Claims, 13 Drawing Sheets

(51) Int. Cl.
| | |
|---|---|
| *F22B 37/20* | (2006.01) |
| *F02C 6/18* | (2006.01) |
| *C10J 3/48* | (2006.01) |
| *C10J 3/52* | (2006.01) |
| *F01K 23/10* | (2006.01) |
| *F22B 1/24* | (2006.01) |
| *F01K 23/06* | (2006.01) |
| *F22B 21/34* | (2006.01) |
| *F01K 23/14* | (2006.01) |
| *F22B 31/00* | (2006.01) |
| *F22B 37/12* | (2006.01) |
| *F23N 3/00* | (2006.01) |
| *F22B 37/10* | (2006.01) |
| *F22B 1/18* | (2006.01) |
| *C10J 3/74* | (2006.01) |

(52) U.S. Cl.
CPC ............ *F01K 23/068* (2013.01); *F01K 23/10* (2013.01); *F01K 23/14* (2013.01); *F02C 6/18* (2013.01); *F22B 1/1846* (2013.01); *F22B 1/24* (2013.01); *F22B 21/34* (2013.01); *F22B 31/003* (2013.01); *F22B 37/102* (2013.01); *F22B 37/104* (2013.01); *F22B 37/125* (2013.01); *F22B 37/20* (2013.01); *F23M 5/08* (2013.01); *F23N 3/00* (2013.01); *C10J 2300/165* (2013.01); *C10J 2300/1653* (2013.01); *C10J 2300/1675* (2013.01); *C10J 2300/1892* (2013.01); *F23G 2202/101* (2013.01); *Y02E 20/16* (2013.01)

(56) References Cited

U.S. PATENT DOCUMENTS

| | | | | | |
|---|---|---|---|---|---|
| 4,864,973 | A | * | 9/1989 | Lieb | ............ F22B 29/065 122/510 |
| 5,851,497 | A | * | 12/1998 | Brooker | ............ C10J 3/485 422/207 |
| 8,475,546 | B2 | * | 7/2013 | Ten Bosch | ............ C10J 3/845 48/67 |
| 2007/0119577 | A1 | * | 5/2007 | Kraft | ............ F28D 7/163 165/157 |
| 2007/0157859 | A1 | | 7/2007 | Inomata et al. | |
| 2009/0199474 | A1 | * | 8/2009 | Leininger | ............ C10J 3/845 48/69 |
| 2010/0263841 | A1 | * | 10/2010 | Corry | ............ F28F 9/00 165/133 |
| 2013/0340689 | A1 | | 12/2013 | Sato et al. | |
| 2014/0366504 | A1 | | 12/2014 | Haari et al. | |
| 2017/0038060 | A1 | * | 2/2017 | Sripada | ............ F22B 1/1838 |
| 2018/0371340 | A1 | * | 12/2018 | Liu | ............ C01B 3/36 |

FOREIGN PATENT DOCUMENTS

| | | |
|---|---|---|
| JP | 34-007801 B1 | 9/1959 |
| JP | 45-022164 Y1 | 9/1970 |
| JP | 61-175705 U | 11/1986 |
| JP | 05-018265 A | 1/1993 |
| JP | 07-217854 A | 8/1995 |
| JP | 09-165584 A | 6/1997 |
| JP | 3652720 B2 | 5/2005 |
| JP | 2007-178104 A | 7/2007 |
| JP | 2013-151613 A | 8/2013 |
| JP | 2017-146027 A | 8/2017 |
| WO | 2012/127562 A1 | 9/2012 |

OTHER PUBLICATIONS

Written Opinion dated Dec. 5, 2017, issued in counterpart Application No. PCT/JP2017/036731, with English Translation (13 pages).

* cited by examiner

FURNACE WALL, GASIFICATION UNIT AND INTEGRATED GASIFICATION COMBINED CYCLE, AND METHOD OF MANUFACTURING FURNACE WALL

TECHNICAL FIELD

The present invention relates to a furnace wall defined by tubes through which a coolant flows, a gasification unit and an integrated gasification combined cycle, and a method of manufacturing the furnace wall.

BACKGROUND ART

Furnace walls of boilers and gasifiers have a water-cooled wall structure including multiple peripheral wall tubes through which a coolant, such as water, flows (Patent Documents 1 and 2). Fins (connections) are disposed between adjacent peripheral wall tubes to enhance the hermeticity of the furnace wall.

For example, a gasifier includes a combustor that combusts pulverized coal (carbonaceous feedstock) at high temperatures and a reductor that is disposed downstream of the combustor along the flow of the combustion gas and partially combusts the pulverized coal to gasify the pulverized coal. The temperature of the gas in the reductor is lower than that of the gas in the combustor. Thus, a diffuser including a throat section is disposed between the combustor and the reductor, to prevent the gas in the reductor from flowing into the combustor. The throat section reduces the area of the cross-section of the gas flow channel and increases the velocity of the combustion gas flowing from the combustor, to prevent the gas from flowing from the reductor to the combustor.

The diameter of the throat section is set to a predetermined diameter (throat diameter) to optimize the velocity and the distribution of the gas flow. In specific, the throat diameter is determined on the basis of the amount of pulverized coal to be fed to the combustor.

CITATION LIST

Patent Documents

Patent Document 1: JP S61-175705 Y
Patent Document 2: JP H07-217854 A

SUMMARY OF INVENTION

Problem to be Solved by the Invention

A diffuser including a throat section defined by multiple peripheral wall tubes has the following problems.

The inner diameter of the peripheral wall tubes is determined in accordance with the volume and velocity of the flow of cooling water required for achieving the necessary level of heat exchange for the peripheral wall tubes to function as a cooling wall against the heat load determined on the basis of the amount of fed pulverized coal. The outer diameter of the peripheral wall tubes, which is determined by the inner diameter of the peripheral wall tubes, restricts the positioning of the peripheral wall tubes when a furnace wall having a desired throat diameter is to be constructed of an array of peripheral wall tubes and fins.

For example, in some cases, it may be difficult to dispose all peripheral wall tubes at equal radial distances to achieve a desired throat diameter because of the restrictions on the outer diameter determined by the required inner diameter and the required number of peripheral wall tubes for defining the required inner diameter. In such a case, some of the peripheral wall tubes 142 are bent toward the outer circumferential side of the throat section to define the throat section with the remaining peripheral wall tubes 142 (which is known as a culled structure), as illustrated in FIGS. 11A and 11B. Such a structure requires a step of bending the peripheral wall tubes 142 to be culled by an angle different from the other peripheral wall tubes 142. This cause the manufacturing and maintenance processes to be troublesome.

A culled structure, such as that illustrated in FIGS. 11A and 11B, causes an increase in the distance between the unculled peripheral wall tubes 142 in the vicinity of the culled peripheral wall tubes 142 and thus an increase in the area of the fins 140 (see FIG. 11B). The fins 140 having such an increased area may not be able to sufficiently transfer heat to the peripheral wall tubes 142 in comparison to the fins 140 disposed between adjacent peripheral wall tubes 142 in the unculled regions of the furnace wall where the diameter of the cross-section of the flow channel defined by the furnace wall is larger than that of the throat section (for example, regions near the combustor and the reductor). The insufficient heat transfer may cause a temperature increase in the fins 140 and hence a reduction in durability.

An object of the present invention, which has been conceived in consideration of such circumstances, is to provide a furnace wall including a throat section defined by all peripheral wall tubes, a gasification unit and an integrated gasification combined cycle, and a method of manufacturing the furnace wall, the cross-section of the flow channel in the throat section having a diameter smaller than that of other sections of the furnace wall.

Solution to Problem

To solve the issues described above, the present invention provides the following solutions for the furnace wall, the gasification unit and the integrated gasification combined cycle, and a method of manufacturing the furnace wall.

In specific, the furnace wall according to the present invention comprises a plurality of tubes arrayed in a predetermined direction and defining a cylindrical construction, a coolant flowing inside the tubes; and a plurality of connections hermetically sealing spaces between the adjacent tubes, wherein the tubes are disposed in contact with each other at contact areas in a throat section of the cylindrical construction having a horizontal cross-section having a diameter smaller than the diameter of the cross-section of other portions of the cylindrical construction, and some of the connections disposed closer to the inner circumferential side of the cylindrical construction than contact areas comprise inner-circumferential-side connections.

In the throat section of the cylindrical furnace wall, the tubes are disposed in contact with each other at contact areas such that the diameter of the horizontal cross-section in the throat section is smaller than that of other sections of the furnace wall in which connections are disposed between adjacent tubes. In this way, the throat section can be defined by all tubes of the furnace wall in a cylindrical shape without outwardly bending some of the tubes of the furnace wall. Since the process of bending some of the tubes to be culled by an angle different from the angle of the other tubes is not required, ready manufacturing and maintenance is achieved.

A culled structure causes an increase in the distance between the unculled tubes in the vicinity of the culled tubes and thus an increase in the areas of the connections. The connections having large areas cannot sufficiently transfer heat to the tubes. This causes a temperature increase in the connections and hence a reduction in durability. In the present invention, adjacent tubes are disposed in contact with each other to avoid a culled structure, and thus a reduction in durability of the connections can be prevented.

Since the connections are disposed closer to the inner circumferential side than the contact areas of the cylindrical furnace wall, the spaces between adjacent tubes can be certainly sealed to prevent gas from entering the connections, and strength can be enhanced.

In sections of the furnace wall where the diameter of the cross-section of the gas flow channel is larger than that of the throat section, tubes may be disposed apart from each other without being in contact with each other, and connections may be disposed between adjacent tubes.

In the furnace wall according to the present invention, the inner-circumferential-side connections each comprise a rod-like member disposed in the longitudinal direction of the tubes.

Since the rod-like members are disposed along the longitudinal direction of the tubes, grooves may be formed in the narrow regions between the tubes during welding. The rod-like members can function as sealing rods that seal the spaces between the tubes.

In the furnace wall according to the present invention, some of the connections in the throat section comprise outer-circumferential-side connections disposed closer to the outer circumferential side of the cylindrical construction than the contact areas.

The throat section is provided with inner-circumferential-side connections disposed closer to the inner circumferential side of the cylindrical construction than the contact areas and outer-circumferential-side connections disposed closer to the outer circumferential side than the contact areas. This can enhance the sealing ability and the strength.

In the furnace wall according to the present invention, the outer-circumferential-side connections comprise rod-like members extending in the longitudinal direction of the tubes, the inner-circumferential-side connections comprise rod-like members extending in the longitudinal direction of the tubes, the rod-like members of the outer-circumferential-side connections are connected with the respective rod-like members of the inner-circumferential-side connections, the outer-circumferential-side connections and the inner-circumferential-side connections having end portions being folded back, and the rod-like members of the outer-circumferential-side connections each have at least one cut.

The rod-like members disposed on the inner and outer circumferential sides can enhance the sealing ability.

By providing at least one cut in each of the rod-like members, gas can be released to prevent the gas from being trapped in a space surrounded by the rod-like members on the inner and outer circumferential sides and prevent the pressure of the gas in the space from excessively increasing. The cuts provided on the outer circumferential side prevent the gas in the furnace from intruding into the contact areas of the tubes.

In the furnace wall according to the present invention, the contact areas of at least some of the tubes have flat portions formed by cutting outer faces of the tubes.

The flat portions are formed by cutting the outer faces of the tubes and disposed in contact with each other to connect the tubes. This decreases the distance between the centers of adjacent tubes and thus can further decrease the diameter of the throat section (throat diameter). Such a configuration is suitable for a case in which the throat diameter cannot be reduced to a desired value by merely disposing adjacent tubes in contact with each other without cutting the outer faces of the tubes.

In the furnace wall according to the present invention, the centers of the tubes are disposed on a horizontal cross-section of the cylindrical construction at same radial distances from the center of the cylindrical construction in the throat section.

By disposing the centers of the tubes at equal radial distances in the throat section, the tubes can bend at the same position and by the same angle. This enables ready manufacturing of many tubes and ready manufacturing of the throat section by assembling and welding the tubes.

In the furnace wall according to the present invention, the centers of the tubes are disposed on a horizontal cross-section of the cylindrical construction at different radial distances from the center of the cylindrical construction in the throat section.

By disposing the centers of the tubes at different radial distances in the throat section, the throat diameter can be reduced in comparison to the diameter of the cross-section of regions in which the tubes are disposed at the same radial distance. In particular, the present invention is suitable for a case in which a desired throat diameter cannot be achieved even though all tubes are disposed at the same radial distance with adjacent tubes in contact with each.

For example, the adjacent tubes are alternately disposed at two different radial distances. This can limit the bending of the tubes to two states, and thus the tubes can be relatively readily bent and the throat section can be relatively readily manufactured. In the case where the tubes are disposed at two different radial distances, it is preferred that the average of the radial distances is equivalent to the desired throat diameter.

A gasification unit according to the present invention configured to generate raw syngas by combusting and gasifying carbonaceous feedstock comprises one of the furnace walls described above, wherein the raw syngas passes through the inside of the cylindrical construction.

An integrated gasification combined cycle according to the present invention comprises the gasification unit configured to generate raw syngas by combusting and gasifying carbonaceous feedstock; a gas turbine unit configured to be rotationally driven by combusting at least a portion of the raw syngas generated at the gasification unit; a steam turbine unit configured to be rotationally driven by steam including steam generated at a heat recovery stream generator introducing turbine flue gas discharged from the gas turbine unit; and a generator linked to the gas turbine unit and the steam turbine unit.

A method of manufacturing a furnace wall according to the present invention comprises arraying a plurality of tubes in a predetermined direction and defining a cylindrical construction, a coolant flowing inside the tubes; and disposing a plurality of connections hermetically sealing spaces between the adjacent tubes, wherein the tubes are disposed in contact with each other at contact areas in a throat section of the cylindrical construction having a horizontal cross-section having a diameter smaller than the diameter of the cross-section of other portions of the cylindrical construction, and the connections are disposed closer to the inner circumferential side of the cylindrical construction than contact areas.

Advantageous Effect of Invention

All tubes can be arrayed to define a throat section defining a flow channel having a cross-sectional diameter smaller than that of other sections by disposing the tubes in contact with each other. In this way, the furnace wall can be readily manufactured and maintained.

DESCRIPTION OF EMBODIMENTS

Embodiments of the present invention will now be described with reference to the drawings.

First Embodiment

A first embodiment of the present invention will now be described.

An integrated gasification combined cycle (IGCC) 10 including a gasification unit 14 uses air as an oxygen containing gas and is of an air-combustion type in which raw syngas is generated from fuel in the gasification unit 14. In the integrated gasification combined cycle 10, the raw syngas generated at the gasification unit 14 is purified at a gas purification unit 16 into fuel gas, and the fuel gas is fed to a gas turbine unit 17 to generate electrical power. In specific, the integrated gasification combined cycle 10 according to this embodiment is an air-combustion (air-blown) type power plant. The fuel fed to the gasification unit 14 is pulverized coal prepared by pulverizing carbonaceous feedstock, such as coal, with a coal mill.

Figure 1:
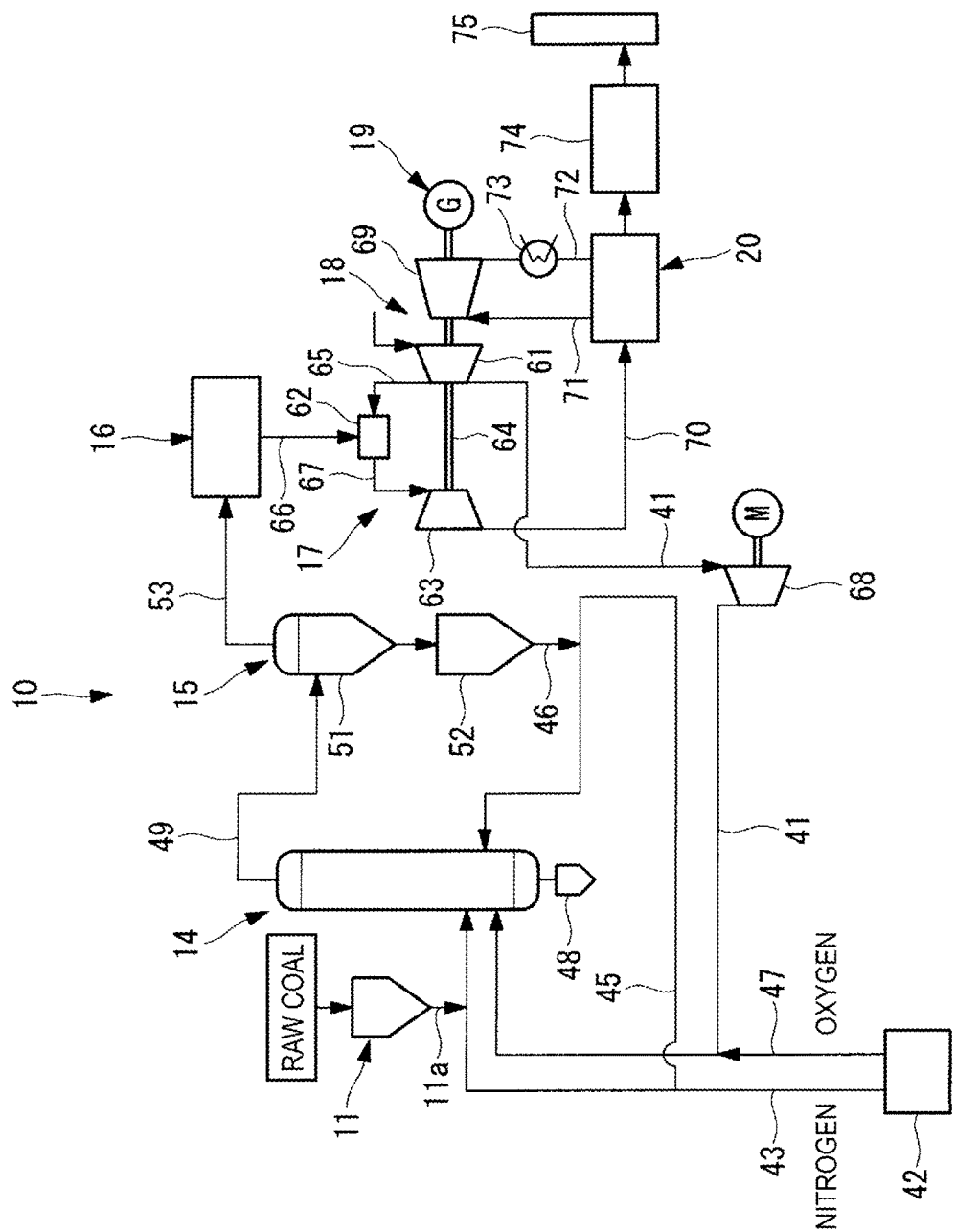
FIG. 1 is a schematic configuration diagram of an integrated gasification combined cycle according to a first embodiment of the present invention.

With reference to FIG. 1, the integrated gasification combined cycle 10 includes a coal feeder 11, a gasification unit 14, a char recovery unit 15, a gas purification unit 16, a gas turbine unit 17, a steam turbine unit 18, a generator 19, and a heat recovery stream generator (HRSG) 20.

The coal feeder 11 receives coal or raw coal and pulverizes the received coal with a coal mill (not shown), to produce minute particles of pulverized coal. The pulverized coal produced at the coal feeder 11 is fed to the gasification unit 14 together with nitrogen gas serving as a conveyor inert gas from an air separation unit 42 described below.

The gasification unit 14 receives the pulverized coal produced at the coal feeder 11 and the char (unreacted coal and ash) collected by the char recovery unit 15 for reuse. An inert gas has an oxygen content of approximately 5 volume percent or less. Typical examples of inert gas include nitrogen gas, carbon dioxide gas, and argon gas and may have any volume percent besides approximately 5% or less.

The gasification unit 14 is connected to a compressed-air feeding line 41 leading from the gas turbine unit 17 (compressor 61). Thus, a portion of the air compressed at the gas turbine unit 17 can be fed to the gasification unit 14 after the pressure of the compressed air is increased to a predetermined pressure at a booster 68. The air separation unit 42 separates nitrogen and oxygen from the air in the atmosphere. The air separation unit 42 is connected to the gasification unit 14 through a first nitrogen feeding line 43. The first nitrogen feeding line 43 is connected to a coal feeding line 11a leading from the coal feeder 11. A second nitrogen feeding line 45 branching from the first nitrogen feeding line 43 is also connected to the gasification unit 14. The second nitrogen feeding line 45 is connected to a char returning line 46 leading from the char recovery unit 15. The air separation unit 42 is connected to the compressed-air feeding line 41 through an oxygen feeding line 47. The nitrogen separated at the air separation unit 42 serves as a gas for conveying coal and char by flowing through the first nitrogen feeding line 43 and the second nitrogen feeding line 45. The oxygen separated at the air separation unit 42 serves as an oxygen containing gas at the gasification unit 14 by flowing through a first oxygen feeding line 47 and the compressed-air feeding line 41.

Figure 2:
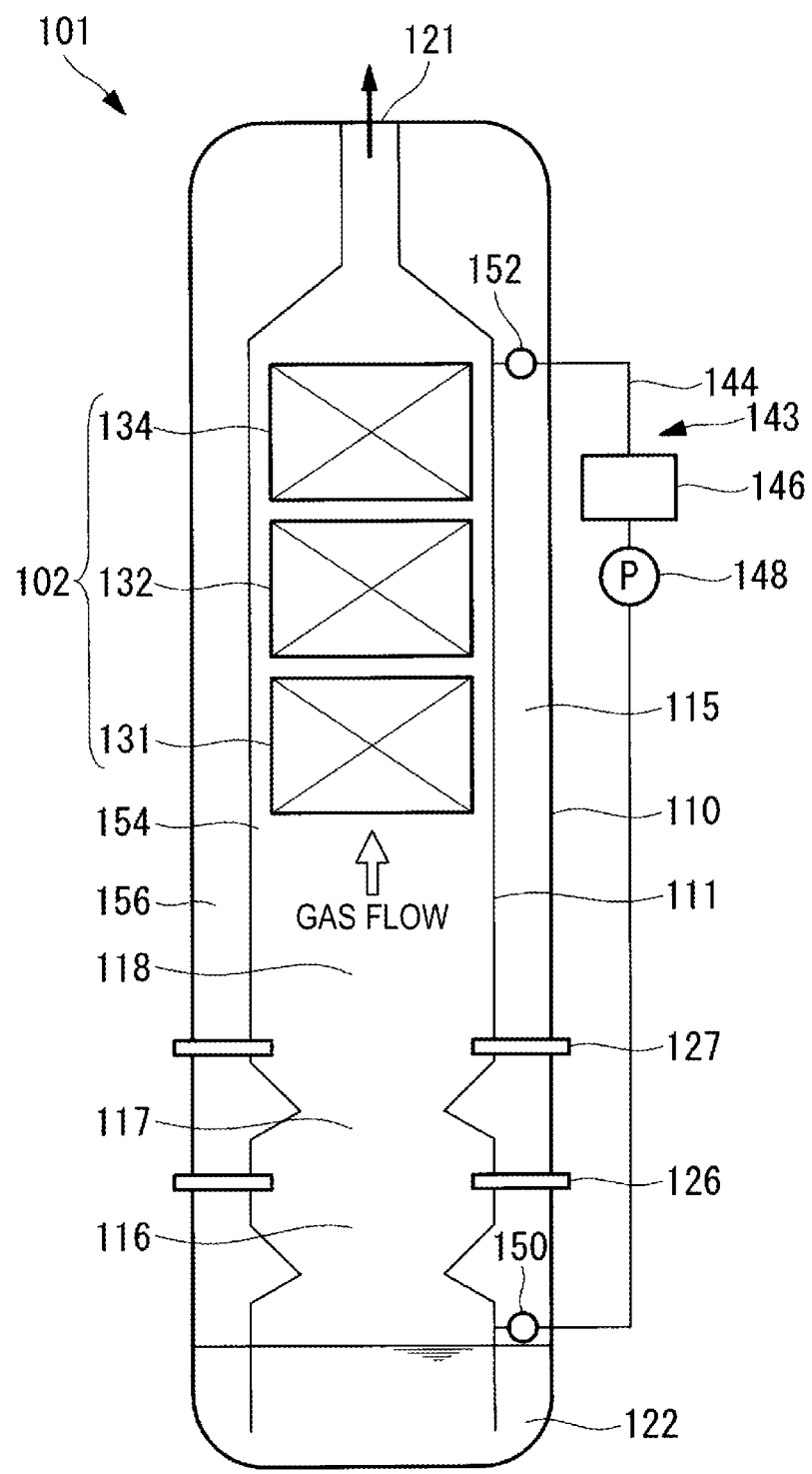
FIG. 2 is a schematic configuration diagram illustrating the gasifier illustrated in FIG. 1.

The gasification unit 14 includes, for example, an air-blown two-stage entrained bed gasifier 101 (see FIG. 2). The pulverized coal and the char are fed to the interior of the gasification unit 14 and gasified through partial combustion with oxygen containing gases (air, oxygen), to generate raw syngas. The gasification unit 14 includes a slag discharger 48 that discharges slag. The gasification unit 14 is connected to a gas production line 49 feeding the raw syngas to the char recovery unit 15, to discharge the raw syngas containing char. In such a case, the gas production line 49 may be provided with a syngas cooler (gas cooler) 102, to cool the syngas to a predetermined temperature before the syngas is fed to the char recovery unit 15, as illustrated in FIG. 2.

The char recovery unit 15 includes a precipitator 51 and a feed hopper 52. In such a case, the precipitator 51 includes one or more porous filters and cyclones and can separate the char from the raw syngas generated in the gasification unit 14. The raw syngas separated from the char is sent to the gas purification unit 16 through a gas discharge line 53. The feed hopper 52 collects the char separated from the raw syngas at the precipitator 51. A bin may be disposed between the precipitator 51 and the feed hopper 52, and multiple feed hoppers 52 may be connected to this bin. The char returning line 46 leading from the feed hopper 52 is connected to the second nitrogen feeding line 45.

The gas purification unit 16 purifies the gas by removing impurities, such as sulfur compounds and nitrogen compounds, from the raw syngas separated from the char at the char recovery unit 15. The gas purification unit 16 purifies the raw syngas to produce fuel gas and feeds the fuel gas to the gas turbine unit 17. The raw syngas separated from the char still has a sulfur content (such as H2S). Thus, the gas purification unit 16 removes and collects the sulfur content with an amine absorbent, for efficient use.

The gas turbine unit 17 includes a compressor 61, a combustor 62, and a turbine 63. The compressor 61 and the turbine 63 are linked by a rotary shaft 64. The combustor 62 is connected to the compressed-air feed line 65 leading from the compressor 61, a fuel-gas feeding line 66 leading from the gas purification unit 16, and a combustible-gas feeding line 67 leading to the turbine 63. The compressor 61 of the gas turbine unit 17 is connected to the compress-air feeding line 41 leading from the compressor 61 to the gasification unit 14. The booster 68 is disposed at an intermediate position on the compressed-air feeding line 41. Thus, the combustor 62 produces combustion gas by mixing the compressed air fed from the compressor 61 with at least a portion of the fuel gas fed from the gas purification unit 16 and combusting the mixture, and feeds the resulting combustion gas to the turbine 63. The turbine 63 rotationally drives the rotary shaft 64 with the fed combustion gas, to rotationally drive the generator 19.

The steam turbine unit 18 includes a turbine 69 linked to the rotary shaft 64 of the gas turbine unit 17. The generator 19 is linked to the proximal end of the rotary shaft 64. The heat recovery stream generator 20 is connected to an flue gas line 70 leading from the gas turbine unit 17 (turbine 63), to exchange heat between the water and the exhaust gas for steam generation. The heat recovery stream generator 20 includes a steam feeding line 71 and a steam recovery line 72, each connected to both the steam turbine unit 18 and the turbine 69. The steam recovery line 72 is connected to a condenser 73. The steam generated at the heat recovery stream generator 20 may include steam generated by heat exchange with the raw syngas at the syngas cooler 102 of the gasifier 101 and further subjected to heat exchange at the heat recovery stream generator 20. Thus, the steam turbine unit 18 rotationally drives the turbine 69 with the steam fed from the heat recovery stream generator 20, thereby rotates the rotary shaft 64 to rotationally drive the generator 19.

A gas emission filter 74 is disposed between the outlet of the heat recovery stream generator 20 and the chimney 75.

The operation of the above-described Integrated gasification combined cycle 10 will now be described.

In the Integrated gasification combined cycle 10 according to this embodiment, the raw coal (coal) fed to the coal feeder 11 is ground into fine particles at the coal feeder 11 to produce pulverized coal. The pulverized coal produced in the coal feeder 11 is fed to the gasification unit 14 together with nitrogen fed from the air separation unit 42 through the first nitrogen feeding line 43. The char collected by the char recovery unit 15 described below is fed to the gasification unit 14 together with nitrogen fed from the air separation unit 42 through the second nitrogen feeding line 45. The compressed air extracted by the gas turbine unit 17 described below is boosted to a higher pressure at the booster 68 and fed to the gasification unit 14 through the compressed-air feeding line 41 together with the oxygen from the air separation unit 42.

At the gasification unit 14, the pulverized coal and the char are combusted by the compressed air (oxygen) and gasified to generate raw syngas. The raw syngas is discharged from the gasification unit 14 through the gas production line 49 and sent to the char recovery unit 15.

At the char recovery unit 15, the raw syngas is fed to the precipitator 51 to separate the micronized char in the raw syngas. The raw syngas separated from the char is sent to the gas purification unit 16 through a gas discharge line 53. In contrast, the micronized char separated from the raw syngas is accumulated in the feed hopper 52 and returned to the gasification unit 14 through the char returning line 46, for recycling.

The gas purification unit 16 purifies the gas by removing impurities, such as sulfur compounds and nitrogen compounds, from the raw syngas separated from the char at the char recovery unit 15, to produce fuel gas. The compressor 61 generates compressed air and feeds the compressed air to the combustor 62. The combustor 62 generates combustion gas by mixing the compressed air fed from the compressor 61 with the fuel gas fed from the gas purification unit 16 and combusting the mixture. Electrical power can be generated by rotationally driving the turbine 63 with the combustion gas and thereby rotationally driving the generator 19 via the rotary shaft 64. In this way, the gas turbine unit 17 can generate electrical power.

The heat recovery stream generator 20 then generates steam by exchanging heat between the flue gas discharged from the turbine 63 of the gas turbine unit 17 and the water and feeds the generated steam to the steam turbine unit 18. Electrical power can be generated at the steam turbine unit 18 by driving the turbine 69 with the steam fed from the heat recovery stream generator 20 and thereby rotationally driving the generator 19 via the rotary shaft 64. Besides the gas turbine unit 17 and the steam turbine unit 18 rotationally driving a single generator 19 via a single axis, the gas turbine unit 17 and the steam turbine unit 18 may rotationally drive multiple generators 19 via multiple axes.

The gas emission filter 74 removes harmful substances in the exhaust gas discharged from the heat recovery stream generator 20 and releases the filtered gas from the chimney 75 to the atmosphere.

The gasification unit 14 of the above-described Integrated gasification combined cycle 10 will now be described in detail with reference to FIGS. 1 and 2.

The gasification unit 14 includes a gasifier 101 and a syngas cooler 102, as illustrated in FIG. 2.

The gasifier 101 extends in the vertical direction. Pulverized coal and oxygen are fed to the lower portion in the vertical direction and partially combusted and gasified into raw syngas. The generated raw syngas flows from the lower portion to the upper portion in the vertical direction. The gasifier 101 includes a pressure vessel 110 and a gasifier wall (furnace wall) 111 disposed in the interior of the pressure vessel 110. The gasifier 101 has an annular portion 115 disposed in the space between the pressure vessel 110 and the gasifier wall 111. The gasifier 101 includes a combustor 116, a diffuser 117, and a reductor 118 in the interior space of the gasifier wall 111 in order from the lower portion in vertical direction (i.e., from the upstream of the flow direction of the raw syngas).

The pressure vessel 110 has a hollow cylindrical shape. A gas exhaust port 121 is disposed at the upper end portion of the pressure vessel 110, and a slag hopper 122 is disposed at the lower end portion (bottom portion) of the pressure vessel 110. The gasifier wall 111 has a hollow cylindrical shape. The wall face of the gasifier wall 111 faces the inner face of the pressure vessel 110. The pressure vessel 110 according to this embodiment has a cylindrical shape, and the diffuser 117 of the gasifier wall 111 also has a cylindrical shape. The gasifier wall 111 is connected to the inner face of the pressure vessel 110 with a supporting member (not shown).

The gasifier wall 111 partitions the interior of the pressure vessel 110 into an inner space 154 and an external space 156. The gasifier wall 111 has a horizontal cross-section varying in shape at the diffuser 117 between the combustor 116 and the reductor 118, as described below. The upper end portion of the gasifier wall 111 in the vertical direction is connected to the gas exhaust port 121 of the pressure vessel 110, and the lower end portion in the vertical direction is disposed apart from the bottom portion of the pressure vessel 110 with a gap provided therebetween. The slag hopper 122 disposed at the bottom portion of the pressure vessel 110 stores water. The lower end portion of the gasifier wall 111 is immersed in the stored water to provide a seal between the interior and exterior of the gasifier wall 111. Burners 126 and 127 are disposed in the gasifier wall 111, and the syngas cooler 102 is disposed in the inner space 154. The structure of the gasifier wall 111 will be described below.

The annular portion 115 is a space disposed in the interior of the pressure vessel 110 and the exterior of the gasifier wall 111, i.e., the external space 156. The nitrogen, which is an inert gas, separated at the air separation unit 42 is fed to the annular portion 115 through a nitrogen feed line (not shown). Thus, the annular portion 115 is a space filled with nitrogen. A furnace pressure equalizer (not shown) that equalizes the internal pressure of the gasifier 101 is disposed near the upper position of the annular portion 115 in the vertical direction. The furnace pressure equalizer is in communication with the interior and exterior of the gasifier wall 111, to substantially equalize the pressure of the internal components (the combustor 116, the diffuser 117, and the reductor 118) of the gasifier wall 111 and the pressure of the external components (the annular portion 115) such that the difference in pressure is within a predetermined value.

The combustor 116 provides a space for partially combusting the pulverized coal, the char, and the air. A combusting device including multiple burners 126 is disposed on the gasifier wall 111 at the combustor 116. The high temperature combustion gas generated by partially combusting the pulverized coal and the char at the combustor 116 flows through the diffuser 117 to the reductor 118.

The reductor 118 provides a space for raw syngas generation through gasification. In this space, which is maintained at a temperature sufficiently high for the gasification process, pulverized coal is supplied to the combustion gas fed from the combustor 116 and partially combusted to reduce the pulverized coal to volatiles (such as carbon monoxide, hydrogen, and low hydrocarbons). A combusting device including multiple burners 127 is disposed in the gasifier wall 111 at the reductor 118.

The syngas cooler 102 is disposed in the interior of the gasifier wall 111 and above the burners 127 of the reductor 118 in the vertical direction. The syngas coolers 102 are heat exchangers and includes an evaporator 131, a superheater 132, and an economizer 134 is order from the lower portion of the gasifier wall 111 in the vertical direction (from the upstream of the flow direction of the raw syngas). The syngas coolers 102 exchange heat with the raw syngas generated at the reductor 118, to cool the syngas. The evaporator 131, the superheater 132, and the economizer 134 may be provided by any number beside that illustrated in the drawing.

The operation of the gasification unit 14 described above will now be described.

In the gasifier 101 of the gasification unit 14, the nitrogen and the pulverized coal are ignited by the burners 127 of the reductor 118, and the pulverized coal, the char, and the compressed air (oxygen) are ignited by the burners 126 of the combustor 116. The combustion of the pulverized coal and the char generates high-temperature combustion gas at the combustor 116. At the combustor 116, melted slag is generated in the high-temperature gas atmosphere through combustion of the pulverized coal and the char. The melted slag attaches to the gasifier wall 111, falls to the bottom of the gasifier, and is finally discharged to the water stored in the slag hopper 122. The high-temperature combustion gas generated at the combustor 116 flows through the diffuser 117 up to the reductor 118. In the reductor 118 maintained at a high temperature required for the gasification reaction, the pulverized coal is mixed with the high-temperature combustion gas and subjected to gasification through partial combustion under a high-temperature reducing atmosphere, to generate raw syngas. The gasified raw syngas flows from the bottom to top in the vertical direction.

The gasifier wall 111 will now be described in detail.

Figure 3:
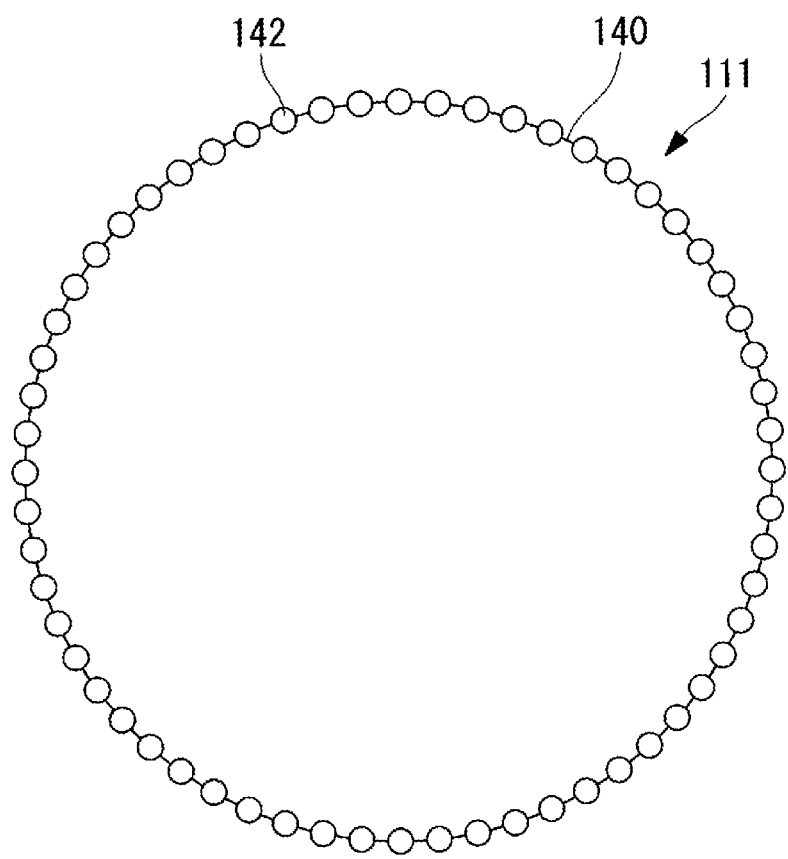
FIG. 3 is a horizontal cross-sectional view of the schematic configuration of a furnace wall of the gasifier illustrated in FIG. 2.

FIG. 3 is a horizontal cross-sectional schematic view of the diffuser 117 of the gasifier wall 111 of the gasification unit 14.

The diffuser 117 of the gasifier wall 111, which has a cylindrical horizontal cross-section, includes multiple peripheral wall tubes 142 and fins (connections) 140 disposed between adjacent peripheral wall tubes 142.

The gasification unit 14 includes a cooling-water circulating mechanism 143 that circulates a coolant (water or stream serving as cooling water) to the peripheral wall tubes 142, as illustrated in FIG. 2. The cooling-water circulating mechanism 143 includes a circulation channel 144, a pump 148, an inlet header 150, and an outlet header 152. The circulation channel 144 is connected to the two ends of each peripheral wall tube 142 through the inlet header 150 and the outlet header 152. The lower end portions of the peripheral wall tubes 142 concentrate at the inlet header 150, and the upper end portions concentrate at the outlet header 152. The peripheral wall tubes 142 are arrayed in the vertical direction to cover the entire area of the gasifier 101. The furnace wall of the gasifier 101 is formed by arraying in the circumferential direction identical peripheral wall tubes 142 extending in the vertical direction from top to bottom, without any of the peripheral wall tubes 142 being cut or additional peripheral wall tubes 142 being provided. The circulation channel 144 includes a cooler 146 and a pump 148.

Alternatively, the circulation channel 144 may include the cooler 146. The cooler 146 cools the cooling water having an increased temperature after passing through the peripheral wall tubes 142, through heat exchange. The cooler 146 may be, for example, a steam generator. Water from the outside is fed through a water feed pipe (not shown) to the inlet header 150 by the pump 148 and to the economizer 134. A steam drum (not shown) is connected to the outlet header 152. The steam drum is also connected to the heat-exchanger tube of the evaporator 131, the heat-exchanger tube of the superheater 132, and the heat-exchanger tube of the economizer 134 through tubes (not shown). The steam drum exchanges heat with the raw syngas generated at the reductor 118 to generate steam from the fed water. The generated steam is fed to the steam turbine unit 18 through a steam exhaust pipe (not shown) together with the steam generated at the heat recovery stream generator 20. The raw syngas is cooled through heat exchange and is discharged from the gas exhaust port 121 at the upper end of the pressure vessel 110.

Figure 4:
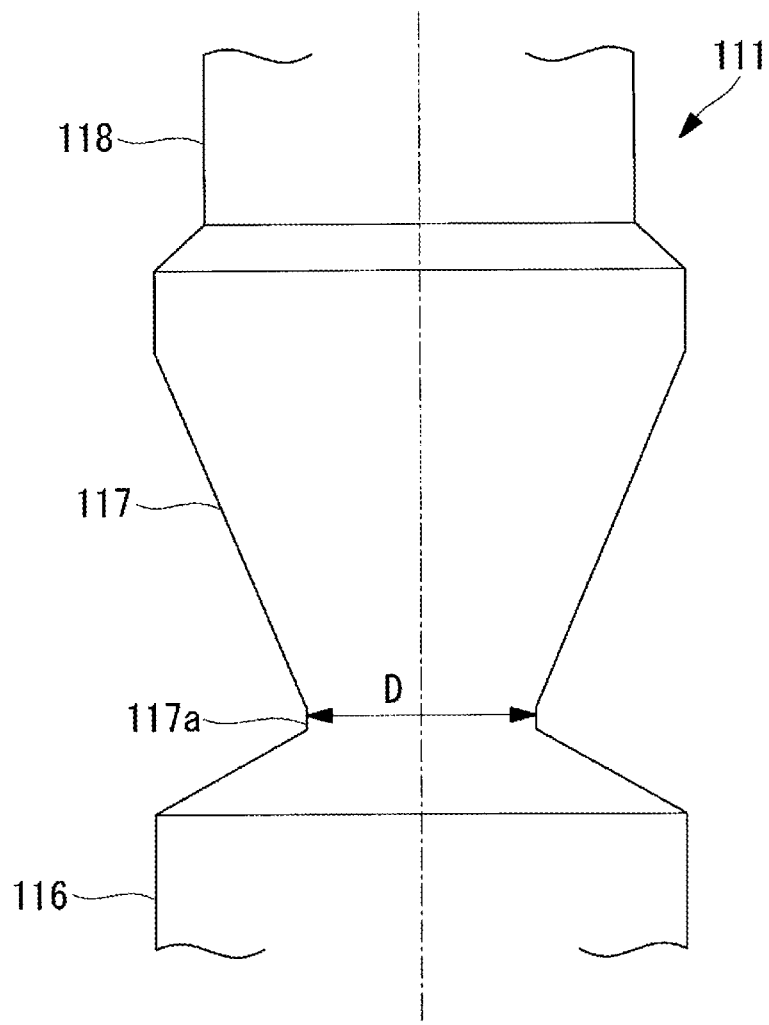
FIG. 4 is a side view of a throat section and the vicinity in the furnace wall.

FIG. 4 is a side view of the diffuser 117 and its vicinity. The diffuser 117 includes a throat section 117a having the smallest cross-sectional diameter in the flow channel. The throat section 117a increases the flow rate of the combustion gas guided from the combustor 116. In this embodiment, the diameter of the horizontal cross-section of the gasifier wall 111 in the throat section 117a or the throat diameter D is approximately 0.7 to 0.9 times the diameter of the horizontal cross-section of the combustor 116.

Figure 5:
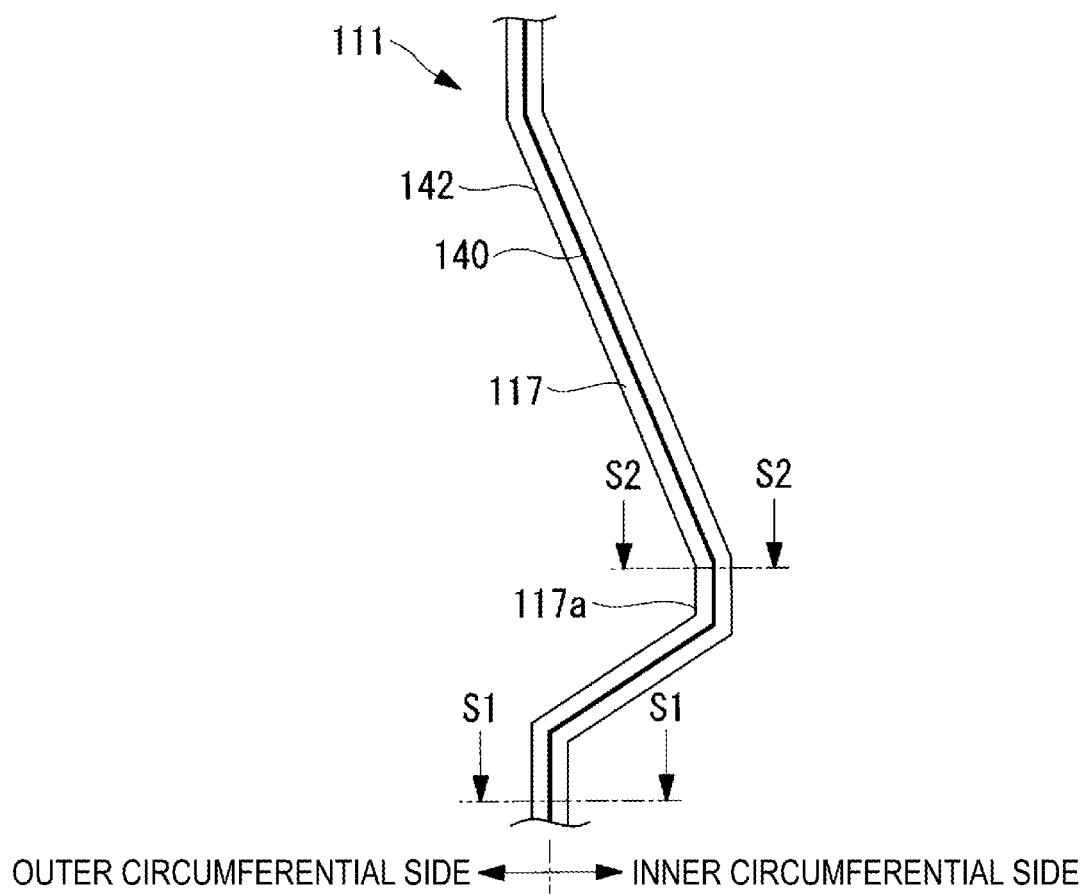
FIG. 5 is an enlarged vertical cross-sectional view of a portion of the furnace wall at a throat section and the vicinity.

FIG. 5 is a vertical cross-sectional view of a portion of one of the peripheral wall tubes 142 in the throat section 117a and the vicinity. In the drawing, the right side of the peripheral wall tube 142 is the inner circumferential side of the gasifier wall 111, and the left side is the outer circumferential side of the gasifier wall 111.

Figure 6:
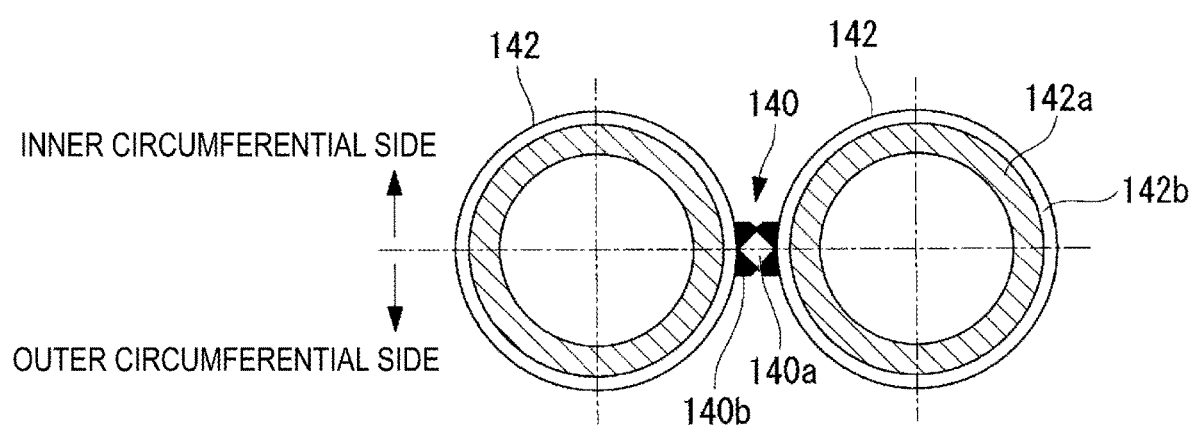
FIG. 6 is an enlarged horizontal cross-sectional view of a portion of the furnace wall at a position away from the throat section.

FIG. 6 illustrates the arrangement of adjacent peripheral wall tubes 142 in a region of the gasifier wall 111 away from the throat section 117a and having a horizontal cross-section having a diameter of the flow channel larger than that of the throat section 117a (for example, in a region closer to the combustor 116 or the reductor 118). FIG. 6 is, for example, a partial cross-sectional view of the peripheral wall tubes 142 of the gasifier wall 111 taken along line S1-S1 (see FIG. 5) in a region upstream of the throat section 117a before the diameter of the flow channel gradually decreases toward the throat section 117a and the vicinity. The drawing illustrates two representative peripheral wall tubes 142. Actually, multiple peripheral wall tubes 142 are further arrayed.

Fins 140 are disposed between adjacent peripheral wall tubes 142 to serve as connections hermetically sealing the spaces between adjacent peripheral wall tubes 142. The fins 140 are disposed on a line connecting the centers of the peripheral wall tubes 142. The fins 140 each include a sealing rod (rod-like member) 140a and welded portions 140b overlaid to fill a space between the adjacent peripheral wall tubes 142 around the sealing rod 140a. The sealing rod 140a and the welded portions 140b are composed of a nickel base alloy or a nickel-containing alloy having high corrosion resistance. Examples of a nickel base alloy include Inconel (registered trademark) 600, Inconel (registered trademark) 622, Inconel (registered trademark) 625, Inconel (registered trademark) 690, HR-160, HASTELLOY X (registered trademark), Alloy 72, and Alloy 72M.

The annular cross-sections of the peripheral wall tubes 142 have the same inner diameter and the same outer diameter. Each peripheral wall tube 142 has a structure in which a main tube 142a composed of carbon steel or a carbon steel alloy having a chrome content of approximately 1% to 2% is covered with a corrosion resistant layer 142b. An example of carbon steel includes STB 510, and examples of a carbon steel alloy include 1 Cr steel and 2 Cr steel, such as STBA 23. The corrosion resistant layer 142b has a thickness of, for example, several millimeters and may be composed of a nickel base alloy or a nickel-containing alloy having high corrosion resistance. Examples of a nickel base alloy include Inconel (registered trademark) 600, Inconel (registered trademark) 622, Inconel (registered trademark) 625, Inconel (registered trademark) 690, HR-160, HASTELLOY X (registered trademark), Alloy 72, and Alloy 72M.

Figure 7:
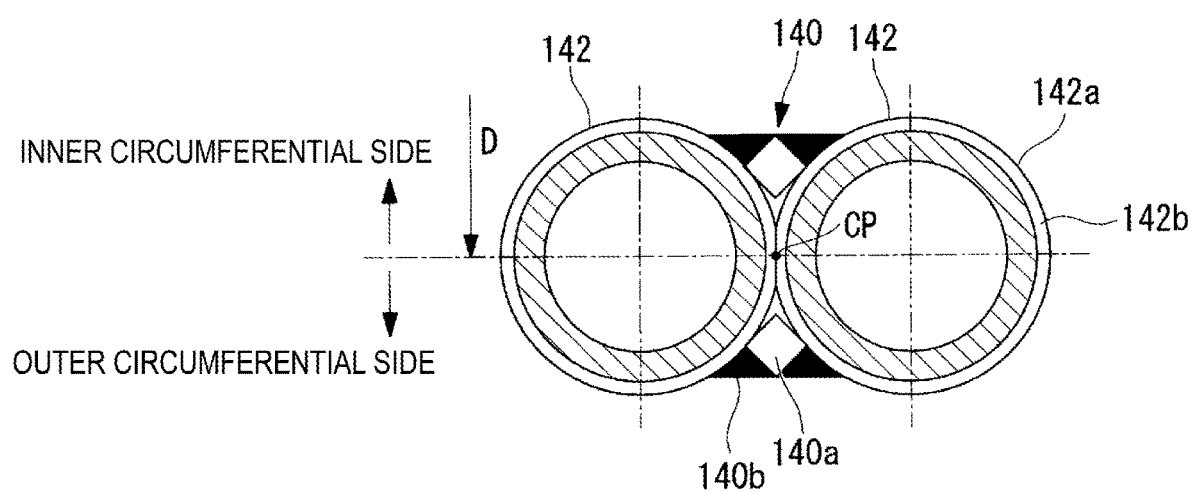
FIG. 7 is an enlarged horizontal cross-sectional view of a portion of the furnace wall in the throat section.

FIG. 7 is a horizontal cross-sectional view taken along line S2-S2 in FIG. 5 of the peripheral wall tubes 142 of the gasifier wall 111 in the throat section 117a and the vicinity. In the drawing, the top side of the peripheral wall tube 142 is the inner circumferential side of the gasifier wall 111, and the bottom side is the outer circumferential side of the gasifier wall 111. The drawing illustrates two representative peripheral wall tubes 142. Actually, multiple peripheral wall tubes 142 are further arrayed.

The fins 140 are disposed on the inner and outer circumferential sides of a contact area CP of the peripheral wall tubes 142, instead of on the line connecting the centers of the peripheral wall tubes 142.

The centers of the peripheral wall tubes 142 are disposed at positions corresponding to the throat diameter D of the gasifier wall 111. The peripheral wall tubes 142 are in direct contact with each other at the contact areas CP disposed on the line connecting the centers of the peripheral wall tubes 142.

Figure 8:
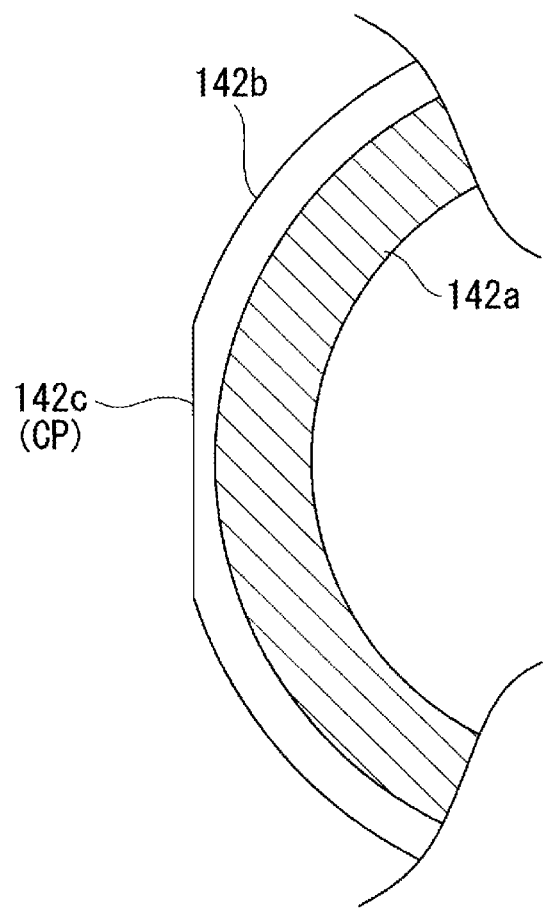
FIG. 8 is an enlarged horizontal cross-sectional view of a flat portion of the external face of one of the peripheral wall tubes illustrated in FIG. 7.

FIG. 8 is an enlarged horizontal cross-sectional view of a portion of a peripheral wall tube 142 including the contact area CP where the adjacent peripheral wall tubes 142 come into contact. A flat portion 142c is formed by removing a segment of the surface of the corrosion resistant layer 142b, as illustrated in the drawing. The flat portion 142c is formed by grinding the corrosion resistant layer 142b to a certain thickness. For example, the flat portion 142c is formed by grinding the corrosion resistant layer 142b, which has a thickness of several millimeters, to a thickness no less than a sufficient thickness. The corrosion resistant layers 142b around the flat portions 142c are overlaid to fill the space defined by the corrosion resistant fins 140 and the adjacent peripheral wall tubes 142. Thus, the corrosion resistance of the peripheral wall tube 142 can be maintained even when the flat portion 142c is formed by cutting off a segment of the surface of the corrosion resistant layer 142b. The flat portion 142c is formed along the longitudinal direction of each peripheral wall tube 142. Adjacent peripheral wall tubes 142 are disposed apart from each other in regions where the diameter of the cross-section of the flow channel in the gasifier wall 111 is large and thus the peripheral wall tubes 142 need not be in contact with each other, as illustrated in FIG. 6. In such a region, the flat portions 142c are omitted.

Figure 9A:
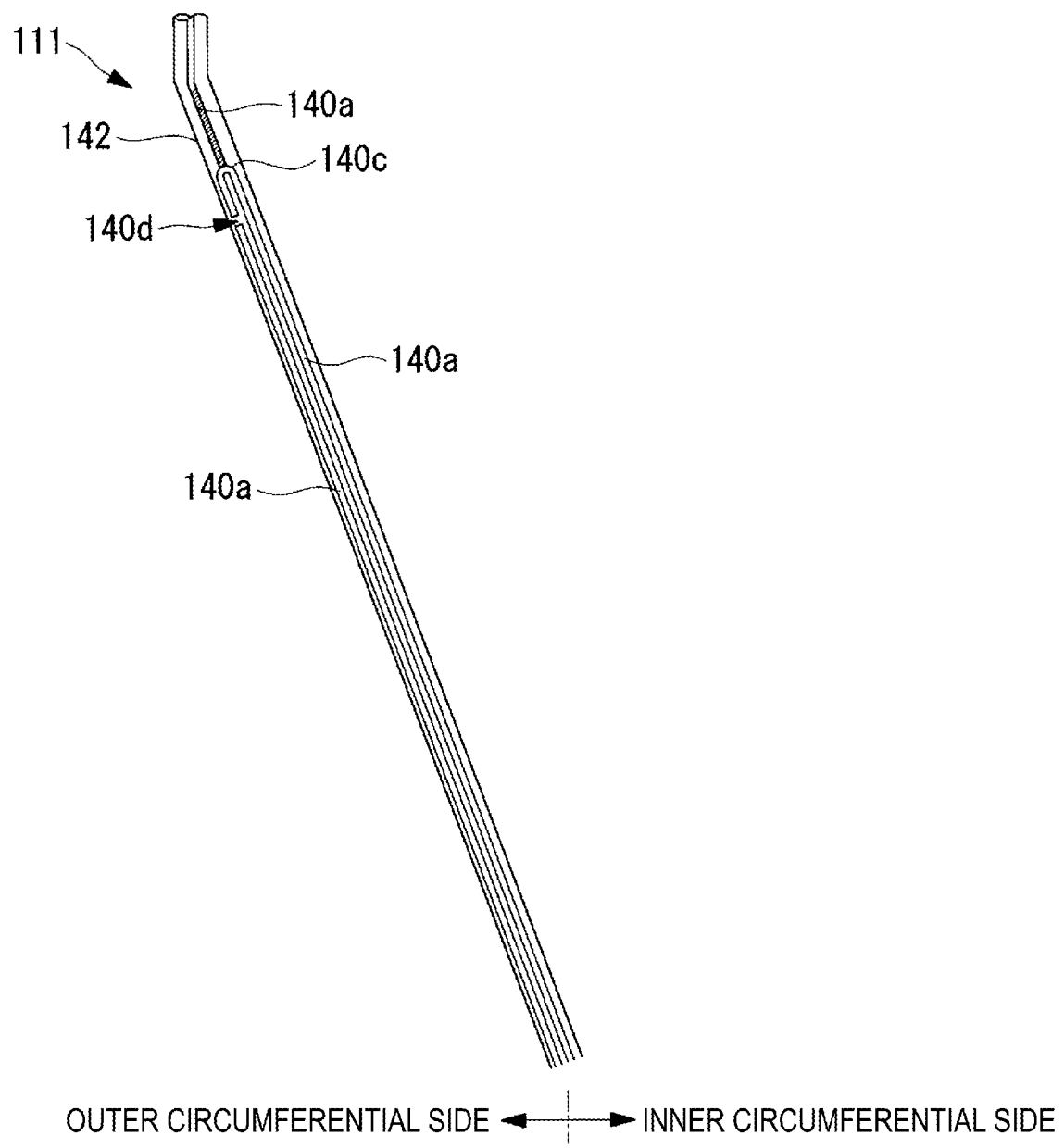
FIG. 9A is a vertical cross-sectional view of the furnace wall indicating the positions of a sealing rods.
Figure 9B:
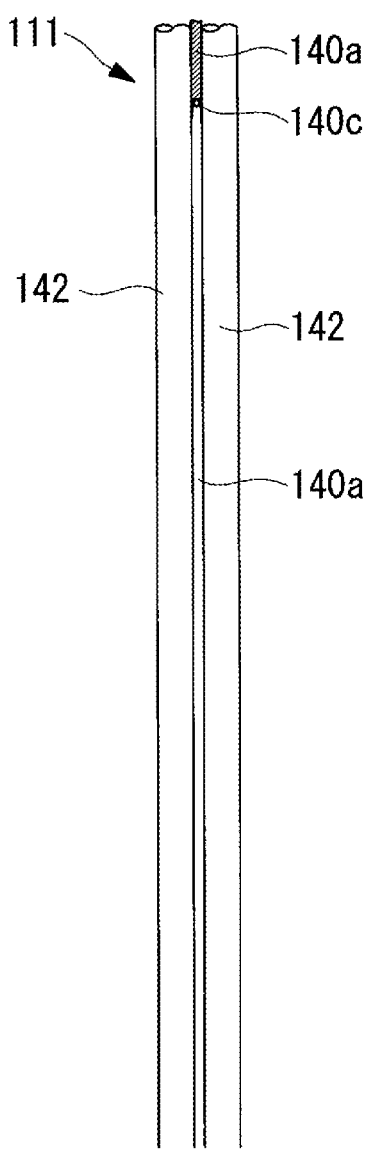
FIG. 9B is a front view of the inner circumferential side of the furnace wall indicating the position of a sealing rod.

FIGS. 9A and 9B illustrate a structure connecting a region including only one sealing rod 140a disposed between adjacent peripheral wall tubes 142 as illustrated in FIG. 6 and a region including two sealing rods 140a on the inner and outer circumferential sides as illustrated in FIG. 7. FIG. 9A is a vertical cross-sectional view of the peripheral wall tubes 142 from the circumferential direction of the gasifier wall 111. FIG. 9B is a front view of the peripheral wall tubes 142 from the inner circumferential side of the gasifier wall 111.

With reference to FIG. 9A, the sealing rod 140a in a region of the gasifier wall 111 where the diameter of the cross-section of the flow channel gradually decreases toward the throat section 117a is folded back in a U-shape at one end 140c (the upper end in the drawing) such that the sealing rod 140a is disposed on both the inner and outer circumferential sides. Although not illustrated, the sealing rod 140a is folded back also at the other end (the lower end in the drawing). The folded sealing rod 140a has at least one cut 140d. The cut 140d is disposed on the outer circumferential side of the gasifier wall 111 so that corrosive gases do not enter the inner space 154. Such a cut 140d can release gas to prevent the gas from being trapped in the space surrounded by the sealing rods 140a on the inner and outer circumferential sides and the pressure of the gas in the space excessively increasing.

The end 140c (the upper end in the drawing) of the folded sealing rod 140a is welded to the lower end of the single sealing rod 140a disposed in the upper portion. Such a welded structure is also provided at the folded portion at the lower end, although not illustrated.

According to this embodiment, the following advantageous effects are achieved.

Figure 11A:
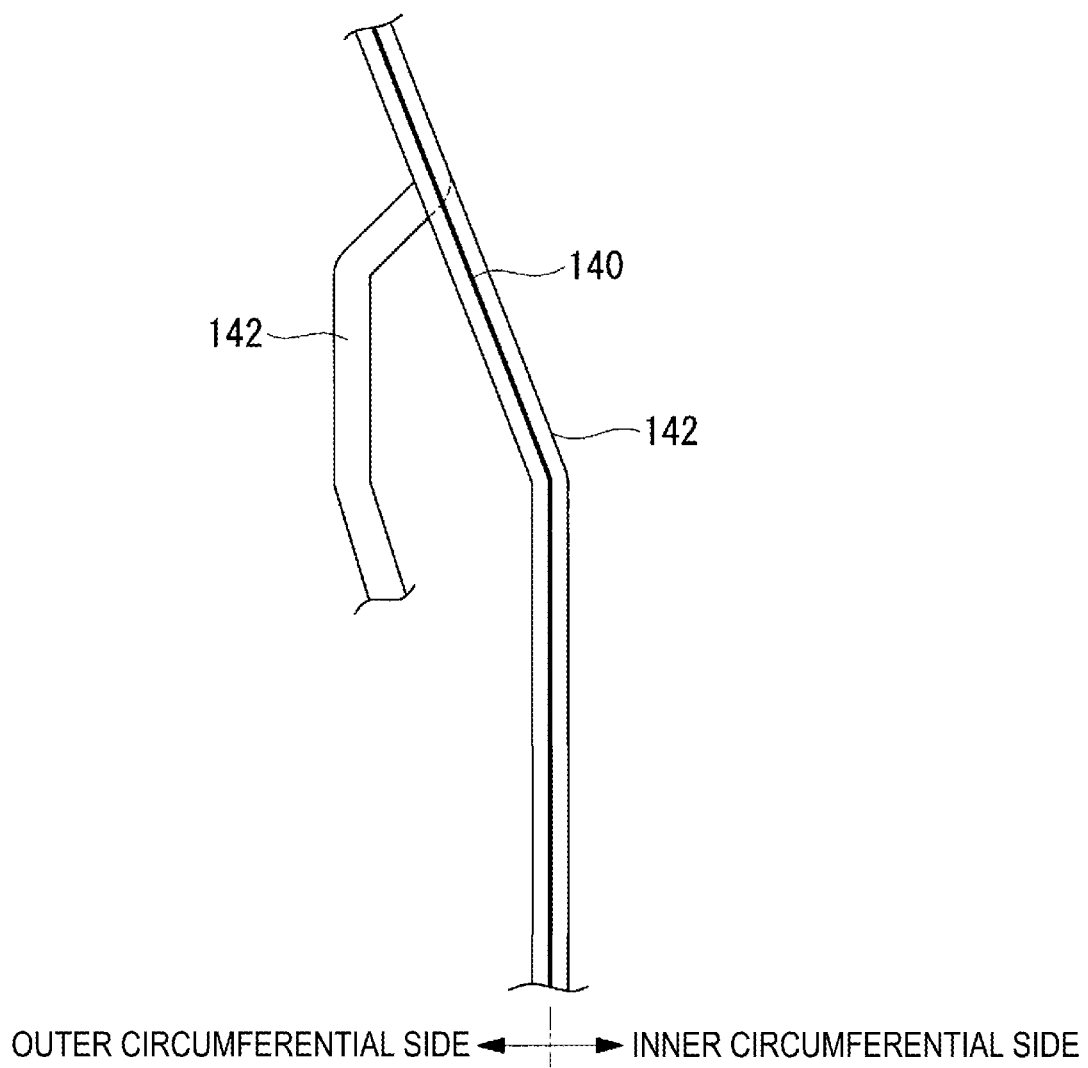
FIG. 11A is a vertical cross-sectional view of a furnace wall having a culled structure of peripheral wall tubes.
Figure 11B:
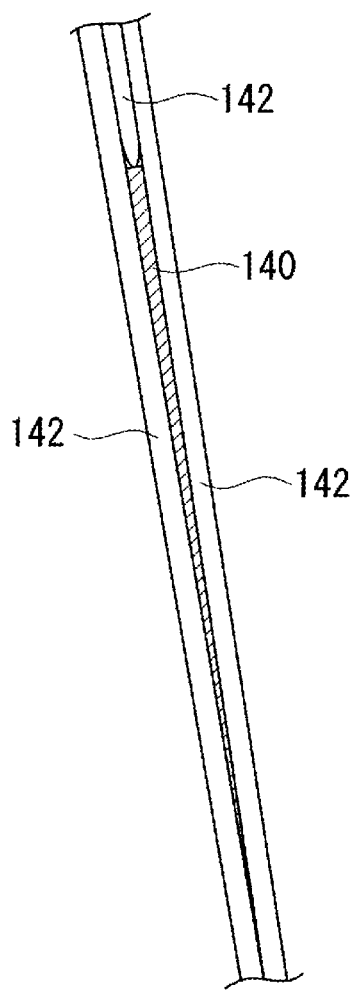
FIG. 11B is a front view of the inner circumferential side of the furnace wall having a culled structure of the peripheral wall tubes.

In the throat section 117a of the cylindrical gasifier wall 111 where the horizontal cross-section of the flow channel in the throat section 117a is smaller than that of other regions of the gasifier wall 111, the peripheral wall tubes 142 are disposed in contact with each other to reduce the diameter of the horizontal cross-section of the cylindrical construction. In this way, the throat section 117a can be constructed of all of the peripheral wall tubes 142 of the gasifier wall 111 without forming a cylindrical construction by outwardly bending some of the peripheral wall tubes 142 of the gasifier wall 111 (without a so-called culled structure (see FIGS. 11A and 11B)). The process of culling some of the peripheral wall tubes 142 by bending the peripheral wall tubes 142 at a position and an angle different from the other peripheral wall tubes 142 can be omitted. Thus, many peripheral wall tubes 142 can be readily manufactured, and the throat section 117a can be readily manufactured and maintained while the peripheral wall tubes 142 are assembled and welded together.

In a culled structure, the fins 140 have a large area because the distance between the peripheral wall tubes 142 is large near the culled peripheral wall tubes 142 (see FIG. 11B) in comparison to the area of the fins 140 disposed between the peripheral wall tubes 142 in the region where the peripheral wall tubes 142 are not culled and the cross-section of the flow channel in the gasifier wall 111 has a diameter larger than that in the throat section 117a (for example, regions near the combustor 116 and the reductor 118). The fins 140 having large areas cannot sufficiently transfer heat to the peripheral wall tubes 142 and cause a temperature increase in the peripheral wall tubes 142. Thus, the durability decreases. In this embodiment, adjacent peripheral wall tubes 142 are disposed in contact with each other to avoid a culled structure, and thus a reduction in durability of the fins 140 can be prevented.

The fins 140 are disposed on the inner circumferential side of the cylindrical gasifier wall 111. Thus, the spaces between adjacent peripheral wall tubes 142 can be certainly sealed, and strength can be enhanced.

The welding can be readily carried out using the sealing rods 140a while enhancing the sealing ability. Thus, corrosive gases in the furnace can be prevented from coming into direct contact with the flat portions 142c or ground faces, and a reduction in corrosion resistance of the flat portions 142c can be prevented.

In the region including the throat section 117a in which the diameter of the cross-section of the flow channel decreases, the fins 140 are disposed on the outer circumferential side of the cylindrical gasifier wall 111 in addition to the inner circumferential side. This can further enhance the sealing ability and the strength of the gasifier wall 111.

The outer surfaces of at least some of the peripheral wall tubes 142 are cut to form the flat portions 142c (see FIG. 8). The peripheral wall tubes 142 are connected with each other by disposing adjacent flat portions 142c in contact with each other. This decreases the distance between the centers of adjacent peripheral wall tubes 142 and thus can further reduce the diameter of the throat section 117a. Such a configuration is suitable for a case in which the throat diameter D cannot be reduced to a desired value by merely disposing adjacent peripheral wall tubes 142 in contact with each other without cutting the outer faces of the peripheral wall tubes 142. It is preferred that the flat portions 142c be formed in all peripheral wall tubes 142. Alternatively, the flat portions 142c may be formed on only some of the peripheral wall tubes 142.

The sealing rods 140a disposed on the inner and outer circumferential sides can enhance the sealing ability.

Since the cut 140d are disposed in at least some of the sealing rods 140a, gas can be released to prevent the gas from being trapped in the space surrounded by the sealing rods 140a on the inner and outer circumferential sides and the pressure of the gas in the space excessively increasing. The cuts 140d disposed on the outer circumferential side can prevent the intrusion of corrosive gases into the inner space 154.

By disposing the centers of the peripheral wall tubes 142 at equal radial distances from the center of the horizontal cross-section of the flow channel in the throat section 117a, all peripheral wall tubes 142 can be bent at the same position and angle. This enables ready manufacturing of many peripheral wall tubes 142 and ready manufacturing of the throat section 117a.

In this embodiment, the flat portions 142c are disposed at the contact positions of the peripheral wall tubes 142. Alternatively, the peripheral wall tubes 142 may be disposed in direct contact with each other without the flat portions 142c if a desired throat diameter D can be achieved on the cross-section of the flow channel in the throat section 117a.

Second Embodiment

A second embodiment of the present invention will now be described with reference to FIG. 10.

In this embodiment, the positions of the peripheral wall tubes 142 differ from those in the first embodiment. Other configurations in this embodiment are the same as those in the first embodiment, and thus the descriptions thereof are omitted.

Figure 10:
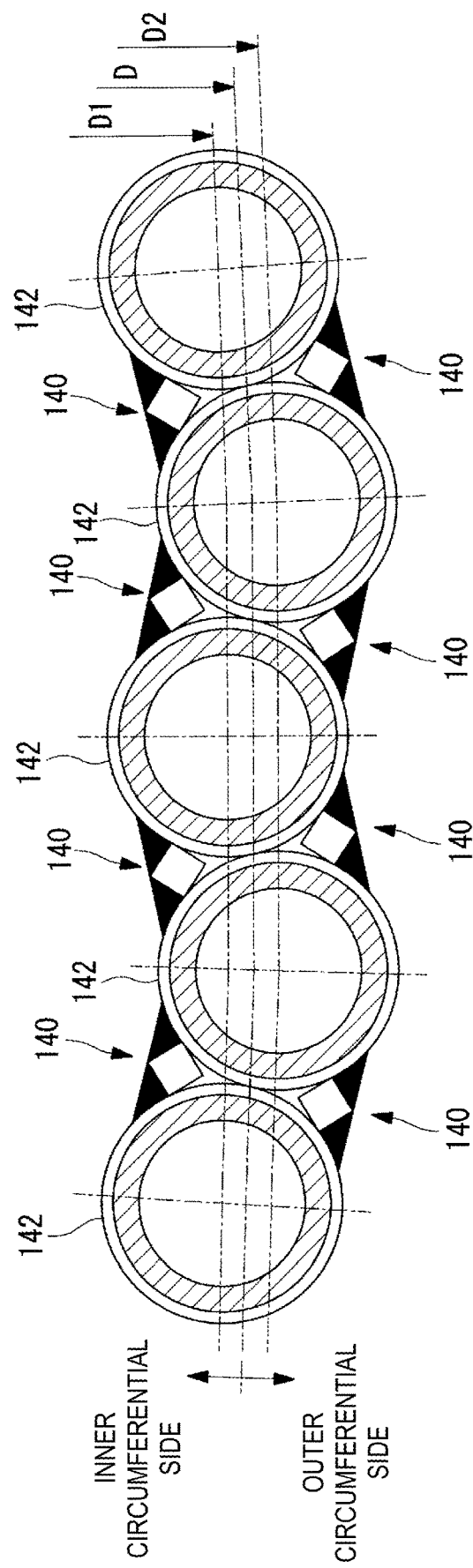
FIG. 10 is an enlarged horizontal cross-sectional view of a portion of the furnace wall in a throat section according to a second embodiment of the invention.

FIG. 10 is a horizontal cross-sectional view of the flow channel in the throat section 117a. Adjacent peripheral wall tubes 142 are disposed at different radial distance from the center of the horizontal cross-section of the flow channel in the gasifier wall 111, as illustrated in the drawing. In detail, peripheral wall tubes 142 in a first group are disposed alternately with the peripheral wall tubes 142 in a second group at a diameter D1 smaller than the throat diameter D. The peripheral wall tubes 142 in the second group are disposed alternately with the peripheral wall tubes 142 in the first group and at a diameter D2 larger than the throat diameter D.

The relation between the throat diameter D and the diameters D1 and D2 are defined by the following expression:

$$D=(D1+D2)/2$$

In specific, the peripheral wall tubes 142 are disposed such that the average of the diameters D1 and D2 equals the throat diameter D.

According to this embodiment, the following advantageous effects are achieved.

By disposing the centers of the peripheral wall tubes 142 at different radial distances from the center of the horizontal cross-section of the flow channel in the throat section 117a, the throat diameter D can be further reduced in comparison to the diameter of the horizontal cross-sections of regions in which all peripheral wall tubes 142 are disposed at the same radial distance from the center of the horizontal cross-section of the flow channel. For example, this embodiment is suitable for a case in which the throat diameter D is larger than the desired throat diameter D even when all peripheral wall tubes 142 are disposed in direct contact with each other at the same radial distances.

The adjacent peripheral wall tubes 142 are alternately disposed at two different radial distances from the center of the horizontal cross-section of the flow channel. This can limit the bending of the peripheral wall tubes 142 to two states, and thus the peripheral wall tubes 142 can be relatively readily manufactured. A desired throat diameter D can be relatively readily achieved, and thus the flexibility of design is enhanced.

In this embodiment, the positions of the peripheral wall tubes 142 are limited to two different radial distances from the center of the horizontal cross-section of the flow channel. In the case where the throat diameter D is larger than the desired throat diameter D even with such positions, the peripheral wall tubes 142 may be disposed at three or more different radial distances. In such a case, three or more bending state are required for the peripheral wall tubes 142, but the flexibility of design in achieving a desired throat diameter D is further enhanced.

Flat portions 142c may be disposed in the areas where the peripheral wall tubes 142 come into contact with each other, as in the first embodiment.

An Integrated gasification combined cycle is described above as an example in the first and second embodiments. Alternatively, the present invention is not limited thereto and may be applied to a gasifier for a chemical plant without a power plant. The present invention is not limited to the furnace wall of a gasifier and may be applied to a furnace wall of a boiler including a water-cooled wall.

In the embodiments described above, the fuel is coal. Alternatively, the fuel may be any carbonaceous feedstock, such as high-grade coal and low-grade coal. Other than coal, the fuel may be biomass, which is a renewable biological, organic resource, including, for example, wood thinned from forests, wood scraps, driftwood, grass, waste, sludge, tires, and fuel (palettes and chips) recycled from such biomass.

In the embodiments described above, the gasifier 101 is a tower-type gasifier. Alternatively, the gasifier 101 may be a crossover-type gasifier accommodating components disposed such that the vertical direction of the components matches the flow direction of the raw syngas.

REFERENCE SIGNS LIST

10 Integrated gasification combined cycle (IGCC)
11 Coal feeder
11a Coal feeding line
14 Gasification unit
15 Char recovery unit
16 Gas purification unit
17 Gas turbine unit
18 Steam turbine unit
19 Generator
20 Heat recovery stream generator
41, 65 Compressed-air feeding line
42 Air separation unit
43 First nitrogen feeding line
45 Second nitrogen feeding line
46 Char returning line
47 Oxygen feeding line
48 Slag discharger
49 Gas production line
51 Precipitator
52 Feed hopper
53 Gas discharge line
61 Compressor
62 Combustor
63, 69 Turbine
64 Rotary shaft
66 Fuel-gas feeding line
67 Combustible-gas feeding line
68 Booster
70 Flue gas line
71 Steam feeding line
72 Steam recovery line
73 Condenser
74 Gas emission filter
75 Chimney
101 Gasifier
102 Syngas cooler
110 Pressure vessel
111 Gasifier wall (furnace wall)
115 Annular portion
116 Combustor
117 Diffuser
117a Throat section
118 Reductor
121 Gas exhaust port
122 Slag hopper
126, 127 Burner
131 Evaporator
132 Superheater
134 Economizer
140 Fin (connector)
140a Sealing rod (rod-like member)
140b Welded portion
140c End
140d Cut
142 Peripheral wall tube
142a Main tube
142b Corrosion resistant layer
142c Flat portion
143 Cooling-water circulating mechanism
144 Circulation channel
146 Cooler
148 Pump
150 Inlet header
152 Outlet header
154 Inner space
156 External space
CP Contact area
D Throat diameter

The invention claimed is:
1. A furnace wall comprising:
a plurality of tubes arrayed in a predetermined direction and defining a cylindrical construction, a coolant flowing inside the tubes; and
a plurality of connections hermetically sealing spaces between the adjacent tubes,
wherein the tubes are disposed in contact with each other at contact areas in a throat section of the cylindrical construction having a horizontal cross-section having a diameter smaller than the diameter of the cross-section of other portions of the cylindrical construction, and some of the connections comprise inner-circumferential-side connections disposed closer to the inner circumferential side of the cylindrical construction than contact areas,
some of the connections in the throat section comprise outer-circumferential-side connections disposed closer to the outer circumferential side of the cylindrical construction than the contact areas,
the outer-circumferential-side connections comprise rod-like members extending in the longitudinal direction of the tubes,
the inner-circumferential-side connections comprise rod-like members extending in the longitudinal direction of the tubes, the rod-like members of the outer-circumferential-side connections are connected with the respective rod-like members of the inner-circumferential-side connections, the outer-circumferential-side connections and the inner-circumferential-side connections having end portions being folded back, and the rod-like members of the outer-circumferential-side connections each have at least one cut.

2. A furnace wall comprising:

a plurality of tubes arrayed in a predetermined direction and defining a cylindrical construction, a coolant flowing inside the tubes; and a plurality of connections hermetically sealing spaces between the adjacent tubes, wherein the tubes are disposed in contact with each other at contact areas in a throat section of the cylindrical construction having a horizontal cross-section having a diameter smaller than the diameter of the cross-section of other portions of the cylindrical construction, and some of the connections comprise inner-circumferential-side connections disposed closer to the inner circumferential side of the cylindrical construction than contact areas, and the contact areas of at least some of the tubes have flat portions formed by cutting outer faces of the tubes.

3. The furnace wall according to claim 1, wherein the centers of the tubes are disposed on a horizontal cross-section of the cylindrical construction at same radial distances from the center of the cylindrical construction in the throat section.

4. A furnace wall comprising:

a plurality of tubes arrayed in a predetermined direction and defining a cylindrical construction, a coolant flowing inside the tubes; and a plurality of connections hermetically sealing spaces between the adjacent tubes, wherein the tubes are disposed in contact with each other at contact areas in a throat section of the cylindrical construction having a horizontal cross-section having a diameter smaller than the diameter of the cross-section of other portions of the cylindrical construction, and some of the connections comprise inner-circumferential-side connections disposed closer to the inner circumferential side of the cylindrical construction than contact areas, and the centers of the tubes are disposed on a horizontal cross-section of the cylindrical construction at different radial distances from the center of the cylindrical construction in the throat section.

5. A gasification unit configured to generate raw syngas by combusting and gasifying carbonaceous feedstock, the gasification unit comprising:

the furnace wall according to claim 1, wherein the raw syngas passes through the interior of the cylindrical construction.

6. An integrated gasification combined cycle comprising:

the gasification unit according to claim 5 configured to generate raw syngas by combusting and gasifying carbonaceous feedstock;

a gas turbine unit configured to be rotationally driven by combusting at least a portion of the raw syngas generated at the gasification unit;

a steam turbine unit configured to be rotationally driven by steam including steam generated at a heat recovery stream generator introducing turbine flue gas discharged from the gas turbine unit; and a generator linked to the gas turbine unit and the steam turbine unit.

7. A method of manufacturing a furnace wall comprising:

arraying a plurality of tubes in a predetermined direction and defining a cylindrical construction, a coolant flowing inside the tubes; and disposing a plurality of connections hermetically sealing spaces between the adjacent tubes, wherein the tubes are disposed in contact with each other at contact areas in a throat section of the cylindrical construction having a horizontal cross-section having a diameter smaller than the diameter of the cross-section of other portions of the cylindrical construction, and the connections are disposed closer to the inner circumferential side of the cylindrical construction than contact areas, some of the connections in the throat section comprise outer-circumferential-side connections disposed closer to the outer circumferential side of the cylindrical construction than the contact areas, the outer-circumferential-side connections comprise rod-like members extending in the longitudinal direction of the tubes, the inner-circumferential-side connections comprise rod-like members extending in the longitudinal direction of the tubes, the rod-like members of the outer-circumferential-side connections are connected with the respective rod-like members of the inner-circumferential-side connections, the outer-circumferential-side connections and the inner-circumferential-side connections having end portions being folded back, and the rod-like members of the outer-circumferential-side connections each have at least one cut.

* * * * *